United States Patent [19]
Waldrop et al.

[11] Patent Number: 5,309,764
[45] Date of Patent: May 10, 1994

[54] TANK GAUGING SYSTEM

[75] Inventors: Mark S. Waldrop, Mt. Baldy; Peter P. Elderton, Fountain Valley; Raymond S. Ohashi, Riverside, all of Calif.

[73] Assignee: ITT Corporation, New York, N.Y.

[21] Appl. No.: 66,846

[22] Filed: May 26, 1993

[51] Int. Cl.⁵ .................... G01F 23/16; G01N 9/18
[52] U.S. Cl. ............................. 73/302; 73/439
[58] Field of Search ................. 73/302, 301, 439

[56] References Cited

U.S. PATENT DOCUMENTS

| | | | |
|---|---|---|---|
| 2,613,535 | 10/1952 | Born | 73/302 |
| 4,043,193 | 8/1977 | Bailey | 73/302 |
| 4,630,478 | 12/1986 | Johnson | 73/299 |
| 4,669,309 | 6/1987 | Cornelius | 73/302 X |
| 5,115,679 | 5/1992 | Uhlarik | 73/438 X |
| 5,163,324 | 11/1992 | Stewart | 73/301 X |

Primary Examiner—Daniel M. Yasich
Attorney, Agent, or Firm—Menotti J. Lombardi

[57] ABSTRACT

A system to determine fluid level in a tank using several tubes extending to different levels in the tank. Gas pressure in the tubes needed to release bubbles from the exit ends of the tubes indicates the hydrostatic head at the exit ends. A control unit compares the pressures in the tubes to find the highest fluid immersed bubbler tube. The proportion of fluid above the immersed tube is calculated from the pressure and added to the height of the immersed tube to get the total fluid depth. A spring loaded fixed length member, magnetically attached to the bottom of the tank, reliably secures the exit ends of the tubes at known fixed vertical locations.

28 Claims, 2 Drawing Sheets

TANK GAUGING SYSTEM

TECHNICAL FIELD

This invention involves fluid level measuring systems of the type that use the pressure needed to bubble gas from a tube into the fluid as an indicator of the pressure of the fluid at the tube outlet depth, which pressure is, in turn, dependent on the height of the fluid level above the bubbler tube outlet.

BACKGROUND OF THE INVENTION

Bubbler tubes comprise a superior way to measure the level of liquids because no mechanical apparatus needs to be immersed in the fluid. Reliability is enhanced and maintenance reduced, especially with corrosive, sticky, viscous, or otherwise difficult fluids. However, accuracy may suffer if the pressure is not correctly determined. A number of factors can generate errors in the pressure measurement and the prior art includes a number of proposed designs to insure better determination of the fluid pressure.

For example, U.S. Pat. No. 5,115,679, to Uhlarik, teaches making the bubbler tube horizontal at its outlet tip so that the gas/liquid interface remains at the same vertical height when it moves somewhat within the bubbler tube as the pressure stabilizes. This insures that one is measuring the pressure at a known height location rather than the pressure at a somewhat higher location where the gas/liquid interface has been pushed by the fluid pressure. But even if one has an accurate pressure reading at a known location in the tank, the height of the liquid above that location cannot be calculated unless the weight of the liquid per unit volume, compared to water, that is, the specific gravity, is also exactly known. This is not always the case. Even common fluids like water vary in specific gravity depending on mineral content and temperature. Fluid mixtures vary their specific gravity over time as more volatile constituents evaporate off.

To solve this problem, U.S. Pat. No. 2,613,535, to Born, teaches the use of two bubbler tubes, vertically separated by a fixed distance, to establish the pressure differential over this fixed distance and calculate therefrom the actual specific gravity or the fluid. Thereafter, the level of the fluid can be calculated from the pressure sensed by the lower of the two bubbler tubes. Similar solutions are proposed in U.S. Pat. No. 4,669,309, to Cornelius, U.S. Pat. No. 4,006,635, to Khoi, and U.S. Pat. No. 4,630,478, to Johnson. All of these prior art approaches fail to overcome certain inherent problems with fluids, however.

No measurement of the density (specific gravity) of a fluid, no matter where taken, or how taken, can be extrapolated to accurately characterize all of the fluid in the tank due to the problem of stratification. Heavier components tend to sink toward the bottom making the liquid denser at lower heights. Temperature variations induce density variations. For example, during the course of the day, or as clouds pass by, the sun may warm one part of the tank and the fluid proximate thereto. The warmed fluid expands and becomes less dense. Convection currents may then begin with lighter fluid rising and heavier fluid sinking. The currents may interact with the component induced stratification in unpredictable ways. The end result is a continuously changing dynamic, non-linear, mathematically chaotic specific gravity distribution. Thus, accuracy is inherently limited. An average approximation of the specific gravity can be measured and used to calculate an approximation of the level and volume of the fluid, but high accuracy is unobtainable using these prior art methods. This problem grows progressively worse as tanks become taller. However, the present invention overcomes the problem.

STATEMENT OF THE INVENTION

Briefly, this invention allows fluid depth in any size tank to be measured to any desired accuracy by using a plurality of bubbler tubes disposed at different depths. To avoid accumulated errors in the specific gravity, only the depth of the small fraction of the fluid above the highest immersed bubbler tube is calculated from the specific gravity. This calculated depth is added to the known height of the highest immersed bubbler tube, an invariant fixed height that is unaffected by variations in specific gravity.

Selection of the highest bubbler tube is accomplished by flowing a gas like nitrogen through each tube sequentially, and measuring the pressure needed to bubble the gas into the fluid. A procedure is followed to find the tube with the lowest non-zero pressure, relative to the pressure above the fluid. This is the highest tube that is still immersed in the fluid. Such a calculation is executed by a suitable microprocessor and program in a manner well known to those skilled in the art. The physical height of this highest tube is exactly known without any need to calculate an extrapolated value based on a possibly inaccurate specific gravity. The only remaining unknown is the depth of fluid above the highest immersed tube. To calculate this depth, the program causes the pressure differential between the highest tube and the surface of the fluid to be stored. Then the pressure difference between the highest immersed tube and the next lower tube is stored. The ratio of these two pressures is equal to the ratio of the depth above the immersed tube to the distance between the immersed tube and the next lower tube. So the depth above the highest immersed tube can be calculated and added to the known height of the highest immersed tube to find the total fluid depth. It should be noted that the total fluid depth is determined with very little reliance on the variable specific gravity of the fluid.

Because the present invention never measures a hydrostatic pressure greater than that from one bubbler tube to the next, a pressure measuring transducer can be selected that has a full range of sensitivity sufficient to measure only the difference in pressure between two adjacent tubes. This results in much greater accuracy Prior art systems are forced to use transducers with a range suitable to measure a full tank hydrostatic head while trying to measure level changes that barely affect the transducer. For example, a transducer operable to measure a one hundred foot tank with a one percent error could be off by a full foot. The same one percent error, utilized to measure only, say, ten feet between adjacent tubes in the tank would be ten times more accurate Since the measurement system of this invention relies primarily on the physical location of the bubbler tubes rather than the speculative specific gravity of the fluid, it becomes more important to be certain of the correct location of the bubbler tubes. To insure the proper locating of the tubes, this invention proposes a support member that magnetically secures to the bottom of the tank so as to positively locate the tube outlets at exact positions. The member is spring tensioned toward the top of the tank so as to always keep the bubbler tube outlets at predetermined depths, even when the tank changes in height with temperature.

In addition, a more accurate pressure measuring procedure is disclosed in which the flow of gas to the bubbler tubes is stopped and the tubes are isolated for a period of time to achieve hydrodynamic balance before the hydrostatic head is recorded. This eliminates the effect of frictional line loss induced pressures and transient atmospheric disturbances from the measured pressures.

These and other benefits and advantages will become more apparent from the drawings and detailed description that follows.

DETAILED DESCRIPTION OF THE INVENTION

Figure 1:
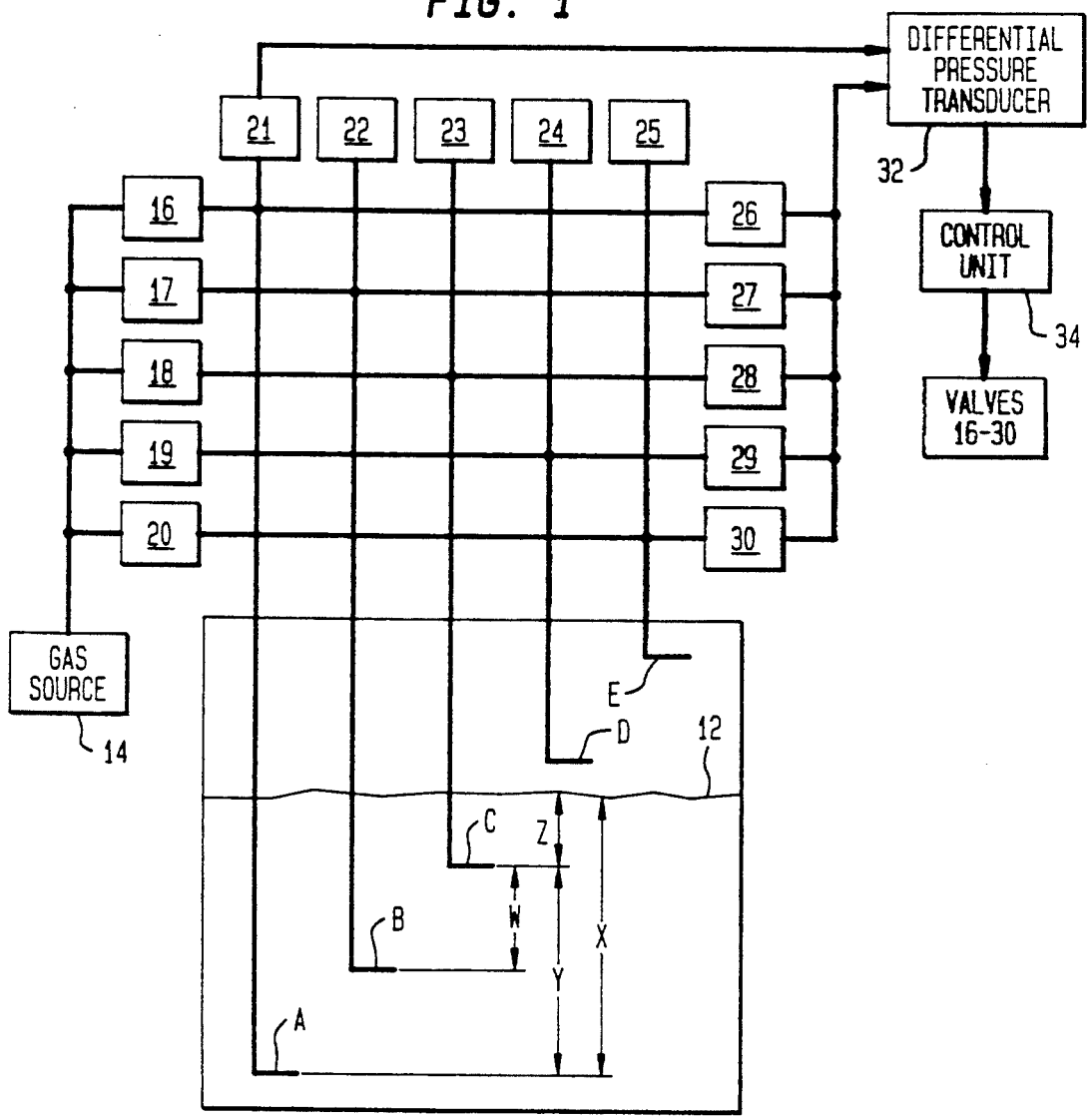
FIG. 1 is a schematic diagram of the tank gauging system of this invention using a plurality of bubbler tubes.

FIG. 1 shows a schematic diagram of the tank gauging system of the present invention to help visualize the method of measuring the fluid level therein. A tank 10 with a fluid level 12 has a series of bubbler tubes A, B, C, D, and E positioned at known heights within the tank. Tube A is generally at the bottom or datum level of the tank although it may be raised slightly to keep it out of sediment. Tube E is intended to always remain above the fluid to sample the ambient pressure above the fluid. Each of the tubes may be supplied selectively with a flow of gas (nitrogen is typical) from a source 14 through an admission valve system comprising a plurality of valves 16-20. The pressure of the gas in tubes A-E may be monitored and compared by a differential pressure transducer 32 connected to tubes A-E on one side through monitor valves 21-25 and on the other side through monitor valves 26-30. All valves 16-30 are controllable by a control unit 34 under the management of a suitably programmed microprocessor.

In the preferred embodiment, transducer 32 is selected to have a full range sensitivity a little greater than the head pressure difference between adjacent tubes for the expected fluid specific gravity. In this way, the maximum sensitivity and accuracy is available to detect even slight level changes.

If the state of the art in transducers achieves, for example, errors of one percent, then the error in level detection is one percent of only the vertical distance between adjacent tube outlets, rather than one percent of the entire tank height.

The old way of measuring the fluid level or depth X was to measure the pressure needed to bubble gas out of tube A, at the bottom, relative to the pressure above the fluid as detected by tube E. This differential pressure is called the hydrostatic head. Since the hydrostatic head for the full height tank is measured, prior art transducers need an operational range large enough to measure the entire tank head. Hence, errors are correspondingly larger.

If one knows the specific gravity of the fluid, X (see FIG. 1) can be calculated from the hydrostatic head alone. If the specific- gravity is not known, prior art systems measure the difference in hydrostatic head of tubes A and B and calculate the specific gravity from this and the vertical distance between tubes A and B. However, for larger tanks, this method is unsatisfactory because the density of the fluid between A and B is not necessarily the same as the density between B and C, or A and C, or even on the other side of the tank. Stratification, settling, and thermal variations can make the A to B density very unrepresentative. The errors grow larger as tanks grow taller.

The present invention uses a method and means of measurement that avoids the accumulating errors caused by variations in the specific gravity. The hydrostatic head is examined at each of tubes A-D to determine the highest immersed bubbler tube, which is tube C in FIG. 1. (Procedures are discussed below to accomplish this examination.) The physical height Y of tube C is fixed, constant, and independent of fluid density. Only the distance Z of level 12 above tube C remains unknown. By comparing the hydrostatic head across Z (measured between tube C and tube E) with the head across W (measured between tubes C and B), the ratio of Z to W is easily established. Since W is a known fixed distance, Z is also easily calculated. Z is then added to Y to give the total depth X of fluid level 12. Note that it is not even necessary to calculate the specific gravity. The unknown increment Z may be made arbitrarily small by using a greater number of bubbler tubes. So any desired accuracy may be achieved.

Comparing the head across Z to the head across a fixed vertical distance W is mathematically equivalent to measuring the density of the fluid in the W area. The W area is selected for comparison because it is between the next lower pair of tubes and contains fluid that is nearest to Z and, thus, is most likely to be similar in density to the fluid within Z. However, other pairs of tubes could be used as a reference, if desired.

In the circumstance where the fluid level 12 is below tube B, there is no available next lower pair of tubes to derive a W head with which to compare. In this case, the hydrostatic head at tube A is used to calculate the depth above A using a default or stored value for the fluid density.

Selecting the Highest Immersed Tube

Numerous software procedures may be employed to find the highest immersed bubbler tube. For example, control unit 34 can open valves 19 and 29 to flow gas through tube D and measure the D hydrostatic head with transducer 32. Simultaneously, valve 25 is opened to present a reference pressure from tube E to transducer 32.

Each tube has its hydrostatic head determined sequentially from the top down, selecting the first tube that has a head pressure over zero. Alternatively, the hydrostatic heads may be sequentially sampled from the bottom up, checking for heads that exceed the operating range of transducer 32. Such an over range reading implies that the fluid level is at least above the next tube up. The sampling continues until an in range hydrostatic head is measured indicating the highest immersed tube. Clearly, many other procedures may be utilized to select the highest tube as well.

Obtaining Accurate Pressure Readings

Figure 2:
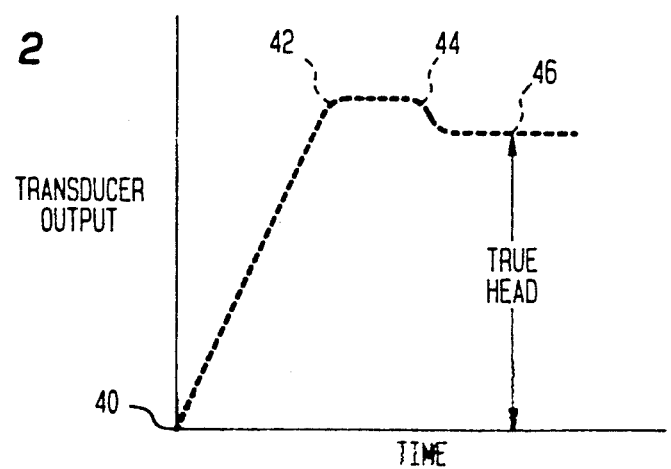
FIG. 2 is a graph of the pressure within a bubbler tube over time as the gas is valved therethrough.

The way in which pressure measurements are taken is important to insure repeatable and accurate pressure readings for the bubbler tubes. FIG. 2 shows how control unit 34 is programmed to operate the bubbler tubes. FIG. 2 graphs the transducer 32 output as it measures pressure applied to a bubbler tube. At the origin 40, a valve is opened to flow gas from source 14 to a tube. As the gas flows into the tube, it purges any accumulated liquid therein and the pressure rises until it equals the hydrostatic pressure at the tube exit plus some additional pressure caused by friction as the gas flows through the tube. This is point 42 in FIG. 2. Control unit 34 is programmed to periodically compare the measured pressure to previous values to test for the continuing rise. When the pressure becomes stable, unit 34 closes the valve to stop the gas flow (point 44 in FIG. 2). The pressure subsides to the true head pressure at point 46 with the removal of the flow induced friction component. Control unit 34 waits for hydrodynamic balance and then stores the pressure value in memory. In this way, only the fluid pressure is measured at the outlet of the bubbler tube, rather than the friction effects. Also the periodic variation of pressure generated as each bubble detaches from the end of the tube is also avoided.

Figure 3A:
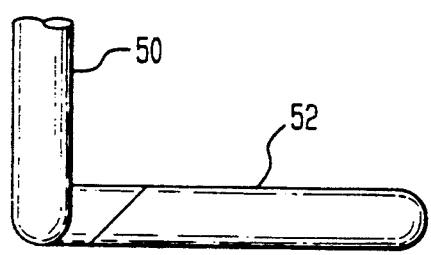
FIGS. 3A and 3B show elevational and plan views of the horizontal exit end of the bubbler tubes.
Figure 3B:
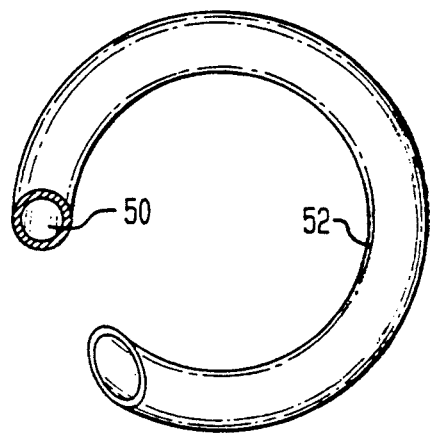

When the flow of gas stops, the gas/liquid interface often pushes back into the bubbler tube a short distance. To insure that the interface is not pushed to a different vertical position, the bubbler tubes of this invention are terminated with a horizontal portion at their exit ends as shown in the respective side and plan views of FIGS. 3A and 3B. The vertical tube 50 bends into a level tube 52, which is curved in a circle in this invention to save space.

Locating the Bubbler Tubes

Figure 4:
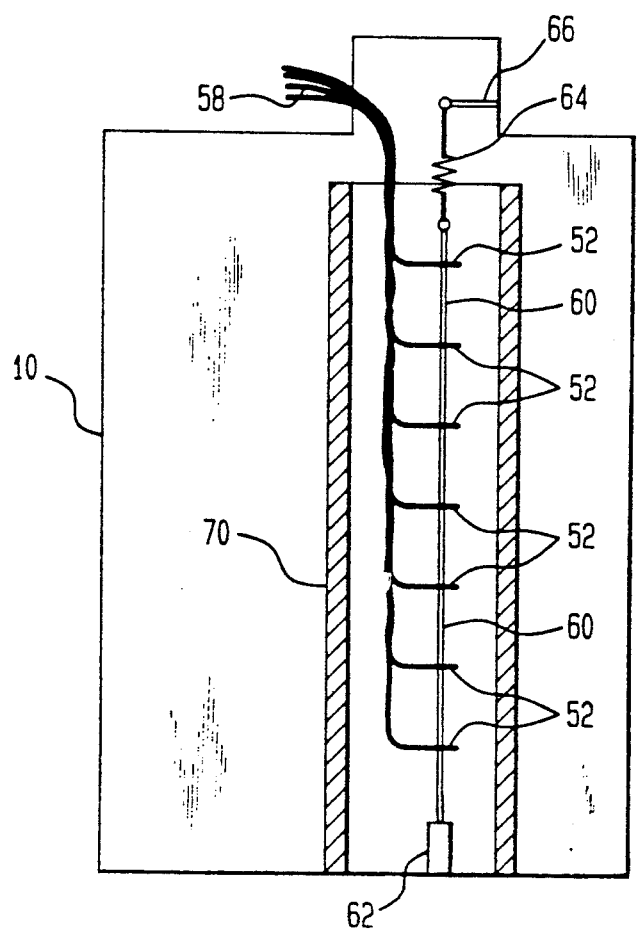
FIG. 4 shows a fixed length rod or chain located with a magnet and spring for supporting the bubbler tubes at fixed locations in the tank.

To be certain that each of the bubbler tube ends 52 are at the correct positions relative to the bottom of the tank, FIG. 4 diagrams one possible means to support the bubbler tubes in tank 10. A plurality of bubbler tubes 58 connect to level exit ends 52 that are securely fastened to a fixed length member 60 which may comprise a rod, chain, or cable. For shorter tanks, a unitary rigid rod works well. For deeper tanks, several rods may be linked together. Chain and cable are also suitable, especially where access is limited. A magnet 62 secures member 60 to the bottom of tank 10, while a spring 64 maintains tension on member 60 so as to keep it extended straight. Spring 64 is bolted to the top of the tank at 66. Hence, even if tank 10 changes height in response to temperature changes, the tube ends 52 remain at selected known distances from the datum zero point at the bottom of the fluid. Member 60 and tube ends 52 are further protected from fluid movement disturbances by a surrounding stilling well 70, shown in section in FIG. 4.

Because of the many possible variations that may be made within the spirit and scope of this invention, limitation is intended only in accordance with the appended claims and their equivalents.

We claim:

1. A method of determining the amount of fluid in a tank comprising the steps of:
   measuring the pressure at a plurality of vertically fixed locations within the tank;
   comparing the measured pressures to identify a location that is immersed in the fluid;
   calculating the depth of the fluid above the immersed location from the fluid induced pressure at the immersed location and the density of the fluid;
   adding the calculated depth to a height of the immersed location; and in which
   one of said vertically fixed locations is the next location below the immersed location and one of said vertically fixed locations is above the fluid.

2. The method of claim 1 in which the step of calculating the depth of the fluid above the immersed location comprises multiplying the distance between said next location below and said immersed location by the ratio of the pressure difference between the immersed location and the location above the fluid divided by the pressure difference between the immersed location and the next location below the immersed location.

3. The method of claim 2 in which the step of identifying an immersed location comprises identifying the highest immersed location.

4. The method of claim 3 in which the step of measuring the pressure includes affixing pressure sensors to a fixed length member, securing one end of the member to the bottom of the tank, and springably securing the other end of the member to the top of the tank.

5. A method of determining the amount of fluid in a tank comprising the steps of:
   measuring the pressure at a plurality of vertically fixed locations within the tank;
   comparing the measured pressures to identify a location that is immersed in the fluid;
   calculating the depth of the fluid above the immersed location from the fluid induced pressure at the immersed location and the density of the fluid;
   adding the calculated depth to a height of the immersed location; and in which
   the step of measuring the pressure includes affixing pressure sensors to a fixed length member, securing one end of the member to the bottom of the tank, and springably securing the other end of the member to the top of the tank.

6. A tank gauging system for determining the level of a fluid in the tank comprising in combination:
   pressure sensing means disposed at a plurality of fixed vertical locations in the tank;
   differential pressure measuring means operable to measure the difference between two sensed pressures;
   valve means operable to connect said differential pressure measuring means to selected pressure sensing means so as to allow comparison of the pressures at said vertical locations;
   control means connected to operate said valve means and record the pressure differences measured by said differential measuring means so as to identify an immersed pressure sensing means, said control means operable to calculate the depth of the fluid above the immersed sensing means from the fluid induced pressure in the immersed sensing means, and said control means further operable to add the calculated depth above the immersed sensing means to the height of the immersed sensing means to obtain the level of fluid in the tank; and
   one of said sensing means is adjacent and below said immersed sensing means and another is proximate the top of the tank and above the fluid level.

7. The system of claim 6 in which said control means is operable to identify the highest immersed sensing means from a comparison of the pressures in said sensing means.

8. The system of claim 6 in which said control means calculates the depth of the fluid above the immersed sensing means by multiplying the distance from said immersed means to the sensing means adjacent and below said immersed sensing means by the ratio of the pressure difference between the immersed sensing means and the sensing means which is proximate the top of the tank to the pressure difference between the immersed sensing means and the sensing means adjacent and below.

9. The system of claim 8 in which said control means is operable to identify the highest immersed sensing means from a comparison of the pressures in said sensing means and use that as the immersed sensing means.

10. A tank gauging system for determining the level of a fluid in the tank comprising in combination:
   pressure sensing means disposed at a plurality of fixed vertical locations in the tank;
   differential pressure measuring means operable to measure the difference between two sensed pressures;
   valve means operable to connect said differential pressure measuring means to selected pressure sensing means so as to allow comparison of the pressures at said vertical locations;
   control means connected to operate said valve means and record the pressure differences measured by said differential measuring means so as to identify an immersed pressure sensing means, said control means operable to calculate the depth of the fluid above the immersed sensing means from the fluid induced pressure in the immersed sensing means, and said control means further operable to add the calculated depth above the immersed sensing means to the height of the immersed sensing means to obtain the level of fluid in the tank;
   said pressure sensing means comprise a plurality of bubbler tubes positioned in said tank, with the exit ends of said tubes at said plurality of fixed vertical locations, and means to periodically flow gas through selected ones of said tubes to establish the pressure needed to bubble gas from the exit end of said tubes; and
   the exit ends of said tubes are secured to a fixed length member, which fixed length member has attaching means at one end adapted to connect the member to the bottom of the tank, and spring means at the opposite end adapted to springably connect the member to the top of the tank.

11. The system of claim 10 in which the exit ends of the tubes are horizontal to maintain the gas to liquid interface at a known height and also curved within the horizontal plane to conserve space.

12. A tank gauging system for determining the level of a fluid in the tank comprising in combination:
   pressure sensing means disposed at a plurality of fixed vertical locations in the tank;
   differential pressure measuring means operable to measure the difference between two sensed pressures;
   valve means operable to connect said differential pressure measuring means to selected pressure sensing means so as to allow comparison of the pressures at said vertical locations;
   control means connected to operate said valve means and record the pressure differences measured by said differential measuring means so as to identify an immersed pressure sensing means, said control means operable to calculate the depth of the fluid above the immersed sensing means from the fluid induced pressure in the immersed sensing means, and said control means further operable to add the calculated depth above the immersed sensing means to the height of the immersed sensing means to obtain the level of fluid in the tank;
   said pressure sensing means comprise a plurality of bubbler tubes positioned in said tank, with the exit ends of said tubes at said plurality of fixed vertical locations, and means to periodically flow gas through selected ones of said tubes to establish the pressure needed to bubble gas from the exit end of said tubes; and
   the pressure in the bubbler tubes is measured after the flow of gas is stopped to eliminate the component of pressure arising from the friction of gas flowing in the tubes.

13. The system of claim 12 in which the exit ends of the tubes are protected from fluid movement disturbance by a surrounding stilling well.

14. The system of claim 13 in which the exit ends of said are secured to a fixed length member, which fixed length member has attaching means at one end adapted to connect the member to the bottom of the tank, and spring means at the opposite end adapted to springably connect the member to the top of the tank.

15. The system of claim 14 in which the exit ends of the tubes are horizontal to maintain the gas to liquid interface at a known height and also curved within the horizontal plane to conserve space.

16. The system of claim 15 in which the pressure in the bubbler tubes is measured after the flow of gas is stopped to eliminate the component of pressure arising from the friction of gas flowing in the tubes.

17. The system of claim 16 in which said attaching means comprises a magnet and said fixed length member comprises a chain.

18. The system of claim 17 in which said attaching means comprises a magnet and said fixed length member comprises a rod.

19. A tank gauging system for determining the level of a fluid in the tank comprising in combination:
   pressure sensing means disposed at a plurality of fixed vertical locations in the tank;
   differential pressure measuring means operable to measure the difference between two sensed pressures;
   valve means operable to connect said differential pressure measuring means to selected pressu e sensing means so as to allow comparison of the pressures at said vertical locations;
   control means connected to operate said valve means and record the pressure differences measured by said differential measuring means so as to identify an immersed pressure sensing means, said control means operable to calculate the depth of the fluid above the immersed sensing means from the fluid induced pressure in the immersed sensing means, and said control means further operable to add the calculated depth above the immersed sensing means to the height of the immersed sensing means to obtain the level of fluid in the tank;

one of said sensing means is adjacent and below said immersed sensing means and another is proximate the top of the tank and above the fluid level;

said control means calculates the depth of the fluid above the immersed sensing means by multiplying the distance from said immersed means to the sensing means adjacent and below said immersed sensing means by the ratio of the pressure difference between the immersed sensing means and the sensing means which is proximate the top of the tank to the pressure difference between the immersed sensing means and the sensing means adjacent and below;

said control means is operable to identify the highest immersed sensing means from a comparison of the pressures in said sensing means and use that as the immersed sensing means; and said pressure sensing means comprise a plurality of bubbler tubes positioned in said tank, with the exit ends of said tubes at said plurality of fixed vertical locations, and means to periodically flow gas through selected ones of said tubes to establish the pressure needed to bubble gas from the exit end of said tubes.

20. The system of claim 19 in which the exit ends of said tubes are secured to a fixed length member, which fixed length member has attaching means at one end adapted to connect the member to the bottom of the tank, and spring means at the opposite end adapted to springably connect the member to the top of the tank.

21. The system of claim 19 in which the exit ends of the tubes are horizontal to maintain the gas to liquid interface at a known height and also curved within the horizontal plane to conserve space.

22. The system of claim 19 in which the pressure in the bubbler tubes is measured after the flow of gas is stopped to eliminate the component of pressure arising from the friction of gas flowing in the tubes.

23. The system of claim 19 which the exit ends of the tubes are protected from fluid movement disturbance by a surrounding stilling well.

24. The system of claim 23 which the exit ends of said are secured to a fixed length member, which fixed length member has attaching means at one end adapted to connect the member to the bottom of the tank, and spring means at the opposite end adapted to springably connect the member to the top of the tank, and further in which the exit ends of the tubes are horizontal to maintain the gas to liquid interface at a known height and also curved within the horizontal plane to conserve space, and further in which the pressure in the bubbler tubes is measured after the flow of gas is stopped to eliminate the component of pressure arising from the friction of gas flowing in the tubes, and further in which said attaching means comprises a magnet.

25. The system of claim 24 in which said fixed length member is a rod.

26. The system of claim 24 in which said fixed length member comprises a chain.

27. A method of determining the amount of fluid in a tank comprising the steps of:

measuring the pressure at at least three vertically fixed locations within the tank;

comparing the measured pressures to identify a highest location that is immersed in the fluid;

calculating the depth of the fluid above the highest immersed location from the fluid induced pressures at the highest immersed location and the density of the fluid;

adding the calculated depth to a height for the highest immersed location; and wherein one of said at least three vertically fixed locations is the next location below the highest immersed location and one of said at least three vertically fixed locations is above the fluid.

28. The method of claim 27 in which the step of calculating the depth of the fluid above the immersed location comprises multiplying the distance between said next location below and said immersed location by the ratio of the pressure difference between the immersed location and the location above the fluid divided by the pressure difference between the immersed location and the next location below the immersed location.

* * * * *